(12) United States Patent
Huh et al.

(10) Patent No.: US 9,733,511 B2
(45) Date of Patent: Aug. 15, 2017

(54) POLARIZING PLATE

(71) Applicant: LG CHEM, LTD., Seoul (KR)

(72) Inventors: Eun Soo Huh, Daejeon (KR); Ki Ok Kwon, Daejeon (KR); In Ho Hwang, Daejeon (KR); Kyun Il Rah, Daejeon (KR); Min Ki Lee, Daejeon (KR); Sae Han Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 304 days.

(21) Appl. No.: 14/219,952

(22) Filed: Mar. 19, 2014

(65) Prior Publication Data

US 2014/0204317 A1 Jul. 24, 2014

Related U.S. Application Data

(63) Continuation of application No. 14/181,342, filed on Feb. 14, 2014, which is a continuation of application No. PCT/KR2012/006580, filed on Aug. 17, 2012.

(30) Foreign Application Priority Data

Aug. 19, 2011 (KR) ........................ 10-2011-0082843
Aug. 19, 2011 (KR) ........................ 10-2011-0082848
Aug. 17, 2012 (KR) ........................ 10-2012-0089888

(51) Int. Cl.
*G02F 1/1335* (2006.01)
*G02B 5/30* (2006.01)

(52) U.S. Cl.
CPC ..... *G02F 1/133528* (2013.01); *G02B 5/3025* (2013.01); *G02F 2201/50* (2013.01);
(Continued)

(58) Field of Classification Search
CPC ............. G02B 5/3025; G02F 1/133528; C09J 163/10; C09J 7/0217; C09J 7/0115; C09J 133/10; C09J 133/12; Y10T 428/1041; Y10T 428/1059; Y10T 428/1073; Y10T 428/1077
(Continued)

(56) References Cited

U.S. PATENT DOCUMENTS 6,074,726 A 6/2000 Vezinet et al.
6,074,729 A * 6/2000 Watanabe ............. C09J 7/0246
428/212

(Continued)

FOREIGN PATENT DOCUMENTS

CN 102099716 A 6/2011
JP 61-083274 4/1986
(Continued)

OTHER PUBLICATIONS

U.S. Appl. No. 14/181,342, filed Feb. 14, 2014.

*Primary Examiner* — Sophie Hon
(74) *Attorney, Agent, or Firm* — Dentons US LLP

(57) ABSTRACT

Provided are a polarizing plate and a liquid crystal display device. The polarizing plate has lighter weight, a smaller thickness, and excellent physical properties such as water resistance, workability, durability, and light leakage preventing ability. In addition, the polarizing plate prevents curling occurring at the polarizing plate or a polarizer in formation thereof, and has excellent thermal resistance or thermal shock resistance.

15 Claims, 2 Drawing Sheets

(52) U.S. Cl.
CPC .... *Y10T 428/1041* (2015.01); *Y10T 428/1073* (2015.01); *Y10T 428/1077* (2015.01)

(58) Field of Classification Search
USPC ......... 428/1.31, 1.53–1.54, 355 RA, 355 EP, 428/355 AC; 349/96, 122
See application file for complete search history.

(56) References Cited

U.S. PATENT DOCUMENTS

| | | | |
|---|---|---|---|
| 2009/0051058 A1* | 2/2009 | Ogomi | G02B 5/3033 264/1.34 |
| 2011/0007244 A1* | 1/2011 | Kim | C08G 18/6229 349/96 |
| 2011/0043733 A1* | 2/2011 | Suzuki | C09J 135/04 349/96 |
| 2011/0065217 A1* | 3/2011 | Terada | C09J 7/04 438/17 |
| 2011/0181813 A1 | 7/2011 | Kim et al. | |

FOREIGN PATENT DOCUMENTS

| | | | | |
|---|---|---|---|---|
| JP | 2-16942 A | 1/1990 | | |
| JP | 1997-033723 | 2/1997 | | |
| JP | 1998-044292 | 2/1998 | | |
| JP | 2001-294828 | 10/2001 | | |
| JP | 2003-177241 | 6/2003 | | |
| JP | 2007-111970 | 5/2007 | | |
| JP | 2008-165200 A | 7/2008 | | |
| JP | 2008-183812 | 8/2008 | | |
| JP | 2009-205141 | 9/2009 | | |
| JP | 2009205141 A * | 9/2009 | | |
| JP | 2009-227804 | 10/2009 | | |
| JP | 2009-265646 A | 11/2009 | | |
| JP | 2010-060787 A | 3/2010 | | |
| JP | 2010-078699 | 4/2010 | | |
| JP | 2010-237678 A | 10/2010 | | |
| JP | 2011-128654 A | 6/2011 | | |
| JP | 2011-154267 A | 8/2011 | | |
| KR | 10-1997-0007403 A | 2/1997 | | |
| KR | 2008-0004021 | 1/2008 | | |
| KR | 2010-0078564 | 7/2010 | | |
| KR | 10-2011-0088973 A | 8/2011 | | |
| TW | 2007-36050 | 9/2006 | | |
| WO | WO 2009145150 A1 * | 12/2009 | | C09J 35/04 |
| WO | 2011065779 A2 | 6/2011 | | |

* cited by examiner

[FIG. 1]
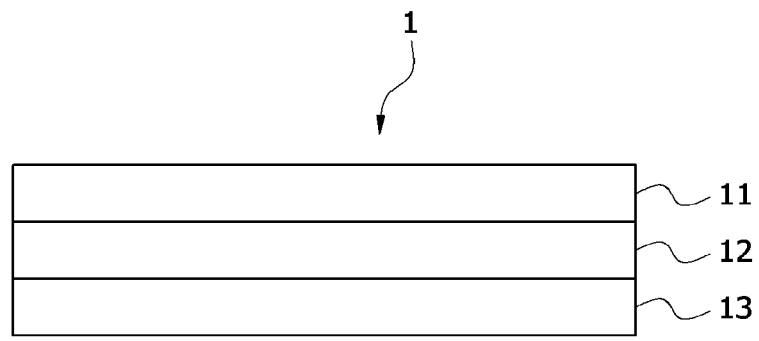
[FIG. 2]
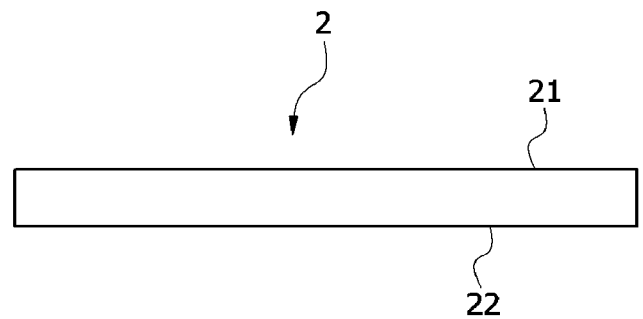
[FIG. 3]
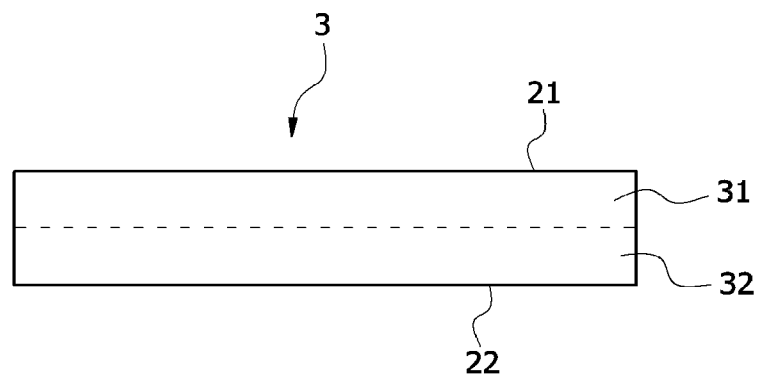

[FIG. 4]
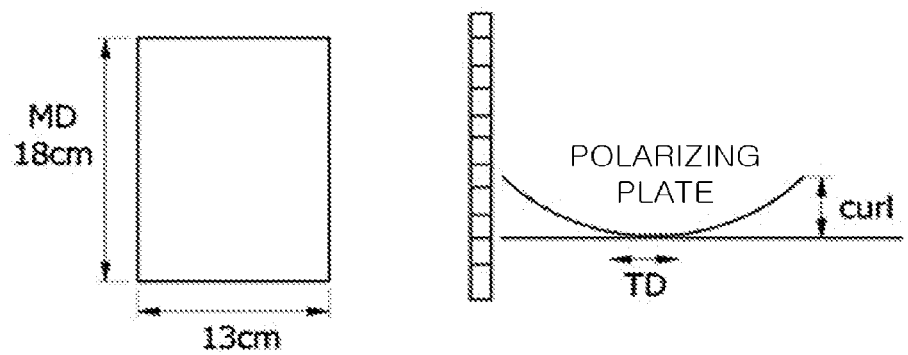

POLARIZING PLATE

This application is a Continuation of U.S. application Ser. No. 14/181,342 filed Feb. 14, 2014, which is a Continuation Bypass Application of International Patent Application No. PCT/KR2012/006580, filed Aug. 17, 2012, and claims the benefit of Korean Application No. 10-2011-0082843, filed on Aug. 19, 2011, Korean Application No. 10-2011-0082848, filed on Aug. 19, 2011 and Korean Application No. 10-2012-0089888, filed on Aug. 17, 2012, all of which are hereby incorporated herein by reference in their entirety for all purposes as if fully set forth herein.

BACKGROUND

1. Field of the Invention

The present application relates to a polarizing plate and a liquid crystal display device.

2. Discussion of Related Art

A polarizing plate is an optically functional film applied to a device such as a liquid crystal display (LCD) device.

The polarizing plate may include a polarizer, which is a functional sheet capable of extracting only light vibrating in one direction from incident light vibrating in several directions, and protective films usually attached to both surfaces of the polarizer. The polarizing plate may further include a pressure-sensitive adhesive layer formed under the protective film and used to attach the polarizing plate to a liquid crystal panel, and a releasing film formed under the pressure-sensitive adhesive layer. In addition, the polarizing plate may include an additional functional film such as an anti-reflection film or a phase retardation film.

SUMMARY OF THE INVENTION

The present application is directed to a polarizing plate and a LCD device.

In one aspect, an exemplary polarizing plate includes a polarizer, an active energy beam-curable adhesive layer having a thickness of 0.1 to 30 µm, and a pressure-sensitive adhesive layer having a thickness of 10 to 80 µm, which are sequentially disposed.

In the specification, the term "at least two elements sequentially disposed," for example, the term "A and B" sequentially disposed means that the elements A and B are disposed in sequence as described above, and another element C may be interposed between A and B, for example, A, C and B may be disposed in order as described above.

In addition, in the specification, when two elements are described as being attached or directly attached to each other, for example, "B is directly attached to A," may mean that no other element may be disposed on at least one main surface of A, and B may be directly attached thereto.

The exemplary polarizing plate includes a polarizer, an adhesive layer and a pressure-sensitive adhesive layer, which are sequentially disposed. In another example, in the polarizing plate, the adhesive layer may be directly attached to the polarizer, and the pressure-sensitive adhesive layer may also be directly attached to the adhesive layer. FIG. 1 shows a structure 1 of an exemplary polarizing plate, in which a polarizer 11, an adhesive layer 12 and a pressure-sensitive adhesive layer 13 are sequentially disposed.

Since the polarizer is usually manufactured of a hydrophilic resin such as polyvinylalcohol, it is generally vulnerable to moisture. In addition, since an extension process is generally performed in the manufacture of the polarizer, contraction easily occurs under humid conditions, and thus optical characteristics of the polarizing plate are degraded. Accordingly, to reinforce physical properties of the polarizing plate, a protective film represented by a triacetylcellulose (TAC) film, is generally attached to both surfaces of the polarizer, and when there is no protective film, due to poor dimensional stability of the polarizer, durability and optical properties are greatly degraded, and water resistance is dramatically decreased.

To this end, in one exemplary structure of the polarizing plate of the present application, since a protective film is not attached to at least one main surface of the polarizer, a thinner and lighter structure and a structure in which an adhesive layer and a pressure-sensitive adhesive layer are directly and continuously attached to the main surface of the polarizer not having the protective film are employed. In addition, as the exemplary polarizing plate of the present application allows both main surfaces of the pressure-sensitive adhesive layer to have different peel strengths, a problem caused by poor dimensional stability of the polarizer may be solved. In the specification, the polarizing plate in which attachment of the protective film is omitted on at least one surface of the polarizer as described above, may be referred to as a thin polarizing plate.

As the polarizer, one conventionally used in the art may be used without particular limitation. As a polarizer, for example, a polyvinylalcohol-based polarizer may be used. Such a polarizer may be formed by adsorbing and aligning a dichroic pigment on a polyvinylalcohol-based resin film. A polyvinylalcohol-based resin constituting the polarizer, for example, may be obtained by gelating a polyvinylacetate resin. As the polyvinylacetate resin, a homopolymer of vinyl acetate; and a copolymer of vinyl acetate and a different monomer capable of being copolymerized with the vinyl acetate may be used. An example of the monomer capable of being copolymerized with vinyl acetate may be unsaturated carbonic acids, olefins, vinyl ethers, unsaturated sulfonic acids or acrylamides having an ammonium group, which are used alone or in combination of at least two thereof. However, the present application is not limited thereto. The degree of gelation for a polyvinyl alcohol resin may usually be about 85 to 100 mol %, and 98 mol % or more. The polyvinylalcohol resin may also be modified, and for example, polyvinylformal or polyvinylacetal modified with aldehydes may be used.

An active energy beam-curable adhesive layer is disposed at one side of the polarizer. The adhesive layer may play a critical role in ensuring physical properties of the polarizing plate when the polarizing plate is a thin polarizing plate. For example, the pressure-sensitive adhesive layer has first and second surfaces, and in one example, the first surface may have a higher tensile modulus than the second surface and may be attached to the adhesive layer. In this case, since the first surface has a lower peel strength than the second surface, it may be easily peeled off from the polarizer. However, in the present application, since the adhesive is disposed between the polarizer and the pressure-sensitive adhesive and cured after a single-molecular reactive material of the adhesive is penetrated or diffused into the pressure-sensitive adhesive before the adhesive layer is cured, the adhesive may cause the first surface of the pressure-sensitive adhesive layer to swell or may increase roughness of the surface. Thus, cohesion between the pressure-sensitive adhesive layer and the polarizer is ensured, and a polarizing plate having excellent physical properties can be provided. In addition, since the active energy beam-curable adhesive is used instead of a water-based adhesive, curling of the polarizing plate caused by transformation of the polarizer and the protective film due to heat generated in thermal drying and heat-curing operations of the water-based adhesive in an operation of forming the polarizing plate, may be prevented, and the polarizer may be effectively protected. As a result, cracks generated in the polarizer may be prevented even under thermal resistant or thermal shock conditions.

In the specification, the term "curing of an adhesive composition or pressure-sensitive adhesive composition" refers to an operation of changing an adhesive or pressure-sensitive adhesive composition to express adhesive or pressure-sensitive adhesive characteristics by a physical action or chemical reaction of components of the composition. In addition, in the specification, the term "active energy beam" may refer to microwaves, IR rays, UV rays, X rays, γ rays, or particle beams such as a particle beams, proton beams, neutron beams and electron beams, and conventionally UV rays or electron beams. In addition, the term "active energy beam-curable" used herein may mean that the curing may be induced by radiation with active energy beams. In one example, curing of the adhesive composition may be performed by a free radical polymerization or cationic reaction due to the radiation with active energy beams, for example, by simultaneously or sequentially performing the free radical polymerization and cationic reactions.

The adhesive layer may include a composition including an epoxy compound or an acryl-based monomer in a cured state, for example, a composition including an epoxy compound and an acryl-based monomer in a cured state. In one example, the adhesive composition may include 5 to 80 parts by weight of the epoxy compound and 10 to 200 parts by weight of the acryl-based monomer, for example, 15 to 60 parts by weight of the epoxy compound and 20 to 150 parts by weight of the acryl-based monomer. When the epoxy compound and the acryl-based monomer are included within the content ranges described above, more effective curing of an adhesive composition may be induced, and physical properties may be enhanced by more effectively performing curing due to living characteristics of the cationic reaction which may induce a dark reaction in a state in which radiation with active energy beams is finished. The unit "parts by weight" used herein refers to a weight ratio between components. An adhesive composition having excellent curing efficiency and physical properties after curing may be provided by controlling the ratio of the components of the adhesive composition.

In one example, the adhesive composition may have a glass transition temperature of 50° C. or more. For example, the adhesive composition may have the glass transition temperature of 50, 70 or 100° C. or more. The upper limit of the glass transition temperature is not particularly limited, and may be controlled within a range of 140° C. or less in consideration of adhesive strength of the adhesive layer. As the glass transition temperature is controlled within the above-described range, even when the thickness of the adhesive layer is small, sufficient durability of the adhesive layer may be ensured. Therefore, even when the protective film is only formed on one surface, cracks in the polarizer may be prevented under thermal resistance or thermal shock conditions.

The term "epoxy compound" used herein may refer to at least one or at least two of monomeric, oligomeric or polymeric compounds including epoxy groups.

The epoxy compound may enhance the physical properties of the adhesive layer such as water resistance and adhesive strength.

For example, as the epoxy compound, the epoxy compound which can be crosslinked or polymerized by a cationic reaction may be used.

In one example, as the epoxy compound, an epoxy resin having a weight average molecular weight (Mw) of 1,000 to 5,000 or 2,000 to 4,000 may be used. In the specification, the weight average molecular weight refers to a conversion value for reference polystyrene measured by gel permeation chromatography (GPC), and unless particularly defined otherwise, the term "molecular weight" refers to the "weight average molecular weight." When the molecular weight of the epoxy resin is 1,000 or more, durability of the adhesive layer may be suitably maintained, and when the molecular weight of the epoxy resin is 5,000 or less, workability, such as coatability of the composition may be effectively maintained.

In one example, as the epoxy compound, an alicyclic epoxy compound or glycidyl ether-type epoxy compound may be used, for example, a mixture of the alicyclic epoxy compound and the glycidyl ether-type epoxy compound may be used.

The term "alicyclic epoxy compound" used herein may refer to a compound including at least one epoxylated aliphatic ring, and the term "glycidyl ether-type epoxy compound" may refer to a compound including at least one glycidyl ether group.

As the alicyclic epoxy compound is included in the epoxy compound, the glass transition temperature of the adhesive composition is increased, and thus the adhesive layer has sufficient durability. Therefore, even when the protective film is formed on only one surface of the polarizer, cracks occurring in the polarizer may be prevented even under thermal resistant or thermal shock conditions.

In the alicyclic epoxy compound including an epoxylated aliphatic ring, for example, the epoxylated aliphatic ring may refer to a compound having an epoxy group formed in an alicyclic ring. Here, a hydrogen atom constituting the alicyclic ring may be optionally substituted with a substituent such as an alkyl group. As the alicyclic epoxy compound, for example, a compound to be specifically exemplified below may be used, but the kind of epoxy compound capable of being used herein is not limited to the following example.

As the alicyclic epoxy compound, first, an epoxycyclohexylmethyl epoxycyclohexanecarboxylate-based compound represented by Formula 1 may be used:

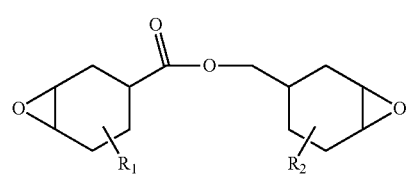

[Formula 1]

In Formula 1, $R_1$ and $R_2$ are each independently hydrogen or an alkyl group.

The term "alkyl group" used herein, unless specially defined otherwise, may refer to a linear, branched or cyclic alkyl group having 1 to 20, 1 to 16, 1 to 12, 1 to 8, or 1 to 4 carbon atoms, and the alkyl group may be unsubstituted or optionally substituted with at least one substituent.

As an another example of the alicyclic epoxy compound, an epoxycyclohexane carboxylate-based compound of alkane diol represented by Formula 2 may be used:

[Formula 2]

In Formula 2, $R_3$ and $R_4$ are each independently hydrogen or an alkyl group, and n is an integer between 2 and 20.

In addition, as still another example of the alicyclic epoxy compound, an epoxy cyclohexylmethyl ester-based compound of dicarboxylic acid represented by Formula 3 may be used:

[Formula 3]

In Formula 3, $R_5$ and $R_6$ are each independently hydrogen or an alkyl group, and p is an integer between 2 and 20.

As yet another example of the alicyclic epoxy compound, an epoxycyclohexylmethyl ether-based compound of polyethyleneglycol represented by Formula 4 may be used:

[Formula 4]

In Formula 4, $R_7$ and $R_8$ are each independently hydrogen or an alkyl group, and q is an integer between 2 and 20.

As yet another example of the alicyclic epoxy compound, an epoxycyclohexylmethyl ether-based compound of alkane diol represented by Formula 5 may be used:

[Formula 5]

In Formula 5, $R_9$ and $R_{10}$ are each independently hydrogen or an alkyl group, and r is an integer between 2 and 20.

As yet another example of the alicyclic epoxy compound, a diepoxytrispiro-based compound represented by Formula 6 may be used:

[Formula 6]

In Formula 6, $R_{11}$ and $R_{12}$ are each independently hydrogen or an alkyl group.

As yet another example of the alicyclic epoxy compound, a diepoxymonospiro-based compound represented by Formula 7 may be used:

[Formula 7]

In Formula 7, $R_{13}$ and $R_{14}$ represents each independently hydrogen or an alkyl group.

As yet another example of the alicyclic epoxy compound, a vinylcyclohexene diepoxide compound represented by Formula 8 may be used:

[Formula 8]

In Formula 8, $R_{15}$ is hydrogen or an alkyl group.

As yet another example of the alicyclic epoxy compound, an epoxycyclopentyl ether compound represented by Formula 9 may be used:

[Formula 9]

In Formula 9, $R_{16}$ and $R_{17}$ are each independently hydrogen or an alkyl group.

As yet another example of the alicyclic epoxy compound, a diepoxy tricyclodecan compound represented by Formula 10 may be used:

[Formula 10]

In Formula 10, $R_{18}$ is hydrogen or an alkyl group.

In more detail, the alicyclic epoxy compound may be, but is not limited to, an epoxycyclohexylmethyl epoxycyclohexane carboxylate compound, an epoxycyclohexane carboxylate compound of alkane diol, an epoxycyclohexylmethyl ester compound of dicarboxylicic acid or an epoxycyclohexylmethyl ether compound of alkane diol, for example, at least one selected from the group consisting of an esterification product of 7-oxabicyclo[4,1,0]heptane-3-carboxylic acid and (7-oxa-bicyclo[4,1,0]hepto-3-yl)methanol (a compound of Formula 1 in which $R_1$ and $R_2$ are hydrogen); an esterification product of 4-methyl-7-oxabicyclo[4,1,0]heptane-3-carboxylic acid and (4-methyl-7-oxabicyclo[4,1,0]hepto-3-yl)methanol (a compound of Formula 1 in which $R_1$ and $R_2$ are 4-$CH_3$); an esterification product of 7-oxabicyclo[4,1,0]heptane-3-carboxylic acid and 1,2-ethanediol (a compound of Formula 2 in which $R_3$ and $R_4$ are hydrogen, and n is 1); an esterification product of (7-oxabicyclo[4,1,0]hepto-3-yl)methanol and adipic acid (a compound of Formula 3 in which $R_5$ and $R_6$ are hydrogen, and p is 2); an esterification product of (4-methyl-7-oxabicyclo[4,1,0]hepto-3-yl)methanol and adipic acid (a compound of Formula 3 in which $R_5$ and $R_6$ are 4-$CH_3$, and p is 2); and an esterification product of (7-oxabicyclo[4,1,0]hepto-3-yl)methanol and 1,2-ethanediol (a compound of Formula 5 in which $R_9$ and $R_{10}$ are hydrogen, and r is 1).

In addition, as the glycidyl ether-type epoxy compound is included in the epoxy compound, a glycidyl ether functional group may form a soft chain having polarity in the adhesive layer after a curing reaction, and thus adhesive strength of the adhesive layer with respect to a PVA polarizer may be enhanced.

In one example, the glycidyl ether-type epoxy compound may include aliphatic polyhydric alcohol or alkyleneoxide thereof, for example, polyglycidyl ether of an ethyleneoxide or propyleneoxide addition product.

In one example, when a mixture of an alicyclic epoxy compound and a glycidyl ether-type epoxy compound is used as the epoxy compound, the alicyclic epoxy compound may be 3,4-epoxycyclohexylmethyl, 3,4-epoxycyclohexanecarboxylate, bis(3,4-epoxycyclohexylmethyl)adipatedicyclopentadienedioxide, limonenedioxide or 4-vinylcyclohexenedioxide, and the glycidyl ether-type epoxy compound may be an epoxy compound having an epoxy group, other than the alicyclic epoxy group. That is, the glycidyl ether-type epoxy compound may be novolac epoxy, bisphenol A-based epoxy, bisphenol F-based epoxy, brominated bisphenol epoxy, n-butyl glycidylether, aliphatic glycidylether (12 to 14 carbon atoms), 2-ethylhexylglycidyl ether, phenyl glycidyl ether, o-cresyl glycidyl ether, nonyl phenyl glycidyl ether, ethyleneglycol diglycidylether, diethyleneglycol diglycidylether, propyleneglycol diglycidylether, tripropyleneglycol diglycidylether, neopentylglycol diglycidylether, 1,4-butanediol diglycidylether, 1,6-hexanediol diglycidylether, trimethylolpropane triglycidylether, trimethylolpropane diglycidylether, trimethylolpropane polyglycidylether, polyethyleneglycol diglycidylether, or glycerin triglycidylether. And the glycidyl ether-type epoxy compound may be, for example, glycidyl ether having a cyclic aliphatic backbone such as 1,4-cyclohexanedimethanol diglycidyl ether or a hydrogenated compound of an aromatic epoxy compound. In one example, the glycidyl ether-type epoxy compound may be, glycidyl ether having a cyclic aliphatic backbone. The glycidyl ether having a cyclic aliphatic backbone may have 3 to 20 carbon atoms, 3 to 16 carbon atoms, or 3 to 12 carbon atoms. However, the present application is not limited thereto.

In this case, the epoxy compound may include 5 to 40 parts by weight of the alicyclic epoxy compound and 5 to 30 parts by weight of the glycidyl ether-type epoxy compound, for example, 15 to 40 parts by weight of the alicyclic epoxy compound and 15 to 30 parts by weight of the glycidyl ether-type epoxy compound, or 20 to 30 parts by weight of the alicyclic epoxy compound and 20 to 30 parts by weight of the glycidyl ether-type epoxy compound. When the alicyclic epoxy compound is included at 5 parts by weight or more, sufficient durability of the adhesive layer may be ensured, and when the alicyclic epoxy compound is included at 40 parts by weight or less, adhesive strength to the PVA polarizer is not decreased. When the glycidyl ether-type epoxy compound is included at 5 parts by weight or more, adhesive strength is increased, and when the glycidyl ether-type epoxy compound is included at 30 parts by weight or less, durability of the adhesive layer is not decreased.

Here, the alicyclic epoxy compound and the glycidyl ether-type epoxy compound may be included in a weight ratio of 3:1 to 1:3, and within this range, effects of enhancing the durability of the adhesive layer and the adhesive strength of the adhesive layer with respect to the PVA polarizer may be maximized.

The adhesive composition further includes a radical polymerizable compound. For example, the radical polymerizable compound may be an acryl-based monomer. The term "radical polymerizable compound" used herein may refer to a compound including at least one polymerizable functional group capable of participating in a crosslinking reaction in a molecular structure, for example, a free radical polymerization reaction. The polymerizable functional group may be, but is not limited to, an allyl group, an allyloxy group, an acryloyl group, a methacryloyl group or acrylonitrile.

In one example, the acryl-based monomer may include a hydrophilic acryl-based monomer or a hydrophobic acryl-based monomer. For example, the acryl-based monomer may include a mixture of a hydrophilic acryl-based monomer and a hydrophobic acryl-based monomer.

For example, to enhance adhesive strength of the adhesive layer to the PVA polarizer, the hydrophilic acryl-based monomer may be included in the acryl-based monomer.

Here, the term "hydrophilic acryl-based monomer" may refer to a monomer having hydrophilicity, and simultaneously including a polymerizable functional group and a polar functional group in a molecular structure, and the polar functional group may be, but is not limited to, a hydroxyl group, a carboxyl group or an alkoxy group.

In one example, the hydrophilic acryl-based monomer may be at least one of the compounds represented by Formulas 11 to 13. For example, the hydrophilic acryl-based monomer may be the compound represented by Formula 11, but the present application is not limited thereto.

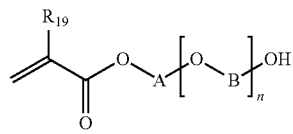

[Formula 11]

In Formula 11, $R_{19}$ is hydrogen or an alkyl group, A and B are each independently an alkylene group or an alkylidene group, and n is a number between 0 and 5.

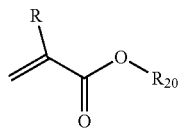

[Formula 12]

In Formula 12, R is hydrogen or an alkyl group, and $R_{20}$ is hydrogen or -$A_3$-C(=O)—OH, in which $A_3$ is an alkylene group or an alkylidene group.

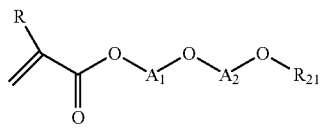

[Formula 13]

In Formula 13, R is hydrogen or an alkyl group, $R_{21}$ is an alkyl group, and $A_1$ and $A_2$ are each independently an alkylene group or an alkylidene group.

The term "alkylene group or alkylidene group" used herein may be a substituted or unsubstituted linear, branched or cyclic alkylene or alkylidene group, which has 1 to 20, 1 to 16, 1 to 12, 1 to 8, or 1 to 4 carbon atoms. For example, the alkylene or alkylidene group may be a linear or branched alkylene or alkylidene group having 1 to 12, 1 to 8 or 1 to 4 carbon atoms.

In Formula 11, n is a number between 0 and 3, for example, a number between 0 and 2.

In addition, in the compound of Formula 12, $R_{20}$ is hydrogen or —$(CH_2)_m$—C(=O)—OH (m is an integer between 1 and 4).

In addition, in the compound of Formula 13, $R_{21}$ may be alkyl having 1 to 4 carbon atoms, and $A_1$ and $A_2$ may be each independently alkylene having 1 to 4 carbon atoms.

The compound of Formula 11 may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, the compound of Formula 12 may be acrylic acid, methacrylic acid or β-carboxyethyl (meth)acrylate, and the compound of Formula 13 may be 2-(2-ethoxyethoxy)ethyl (meth)acrylate, but the present application is not limited thereto.

In one example, the hydrophilic acryl-based monomer may be the compound represented by Formula 11.

The acryl-based monomer may include 10 to 80 parts by weight of the hydrophilic monomer or 20 to 60 parts by weight of the hydrophilic monomer. When the hydrophilic monomer is included in the above range, adhesive strength of the pressure-sensitive adhesive layer with respect to the PVA polarizer may be enhanced.

In addition, in one example, the acryl-based monomer may include at least one hydrophobic acryl-based monomer to control attachment strength, compatibility and glass transition temperature.

Here, the hydrophobic acryl-based monomer may be, for example, acrylic acid ester of an aromatic compound, methacrylic acid ester of an aromatic compound, a long chain alkyl group, alkyl acrylate or alkyl methacrylate, for example, including an alkyl group having 9 or more carbon atoms, for example, 9 to 15 carbon atoms, or acrylic acid ester of an alicyclic compound or methacrylic acid ester of an alicyclic compound.

In one example, the hydrophobic acryl-based monomer may be a compound represented by Formula 14 and/or a compound represented by Formula 15.

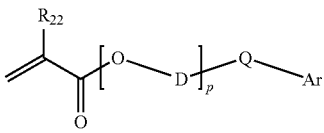

[Formula 14]

In Formula 14, $R_{22}$ is hydrogen or an alkyl group, D is an alkylene group or an alkylidene group, Q is a single bond, an oxygen atom or a sulfur atom, Ar is an aryl group, and p is a number between 0 and 3.

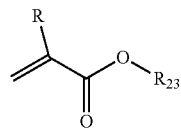

[Formula 15]

In Formula 15, R is hydrogen or an alkyl group, and $R_{23}$ is a monovalent residue derived from an alkyl group having 9 or more carbon atoms, or an alicyclic compound.

In Formula 14, the term "single bond" means that there is no separate atom in the part represented by Q, and D or a carbon atom of C(=O) is directly connected to Ar.

In addition, in Formula 14, an aryl group refers to a monovalent residue derived from a compound having a structure including benzene or a structure in which at least two benzenes are connected to each other or condensed, or a derivative thereof. The aryl group, for example, may be an aryl group having 6 to 22 carbon atoms, 6 to 16 carbon atoms or 6 to 13 carbon atoms, and for example, a phenyl group, a phenylethyl group, a phenylpropyl group, a benzyl group, a tollyl group, a xylyl group or a naphthyl group.

In addition, in Formula 14, p is 0 or 1.

In addition, in the compound of Formula 15, $R_{23}$ is a monovalent residue derived from an alicyclic compound having an alkyl group having 9 to 15 or 3 to 20 carbon atoms, for example, 6 to 15 carbon atoms.

The compound of Formula 14 may be, but is not limited to, phenoxy ethyl (meth)acrylate, benzyl (meth)acrylate, 2-phenylthio-1-ethyl (meth)acrylate, 6-(4,6-dibromo-2-isopropyl phenoxy)-1-hexyl (meth)acrylate, 6-(4,6-dibromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate or 8-(2-naphthyloxy)-1-octyl (meth)acrylate, conventionally phenoxy ethyl (meth)acrylate, benzyl(meth)acrylate 2-phenylthio-1-ethyl acrylate, 8-(2-naphthyloxy)-1-octyl acrylate or 2-(1-naphthyloxy)-ethyl acrylate. For example, the compound of Formula 14 may be phenoxy ethyl (meth)acrylate or benzyl (meth)acrylate.

The compound of Formula 15 may be, but is not limited to, isobornyl (meth)acrylate, cyclohexyl (meth)acrylate, norbornanyl (meth)acrylate, norbornenyl (meth)acrylate, dicyclopentadienyl (meth)acrylate, ethynylcyclohexane (meth)acrylate, ethynylcyclohexene (meth)acrylate or ethynyldecahydronaphthalene (meth)acrylate. For example, the compound of Formula 15 may be the isobornyl (meth)acrylate.

As the acryl-based monomer, the hydrophobic acryl-based monomer may be used, for example, at 60 parts by weight or less, for example, 10 to 60 parts by weight. When the hydrophobic acryl-based monomer is included at less than 10 parts by weight, the number of hydrophilic functional groups is more than that of hydrophobic functional groups, and thus water resistant characteristics of the polarizing plate may be degraded. When the hydrophobic acryl-based monomer is included at more than 60 parts by weight, attachment strength to the PVA polarizing element may be degraded.

In addition, for example, when the compound of Formula 14 is used as the hydrophobic compound, the compound may be included, for example, at 0 to 40 parts by weight or 10 to 30 parts by weight. In addition, when the compound of Formula 15 is used, the compound may be included, for example, at 0 to 30 parts by weight or 5 to 20 parts by weight. In such a weight ratio, attachment strength to a base, for example, an acryl protective film to be described below may be maximized.

In one example, the adhesive composition may further include a reactive oligomer. The term "reactive oligomer" refers to a compound formed by polymerizing at least two monomers, and includes all compounds having a polymerizable functional group capable of participating in a cross-linking reaction, for example, the kind of polymerizable functional group previously described in the description of the category of the radical polymerizable compound.

The reactive oligomer may be, but is not limited to, a photo-reactive oligomer known in the art, urethane acrylate, polyester acrylate, polyether acrylate or epoxy acrylate. For example, the reactive oligomer may be the urethane acrylate.

In the adhesive composition, the reactive oligomer may be included, for example, at 1 to 40 parts by weight or 5 to 20 parts by weight. In such a weight ratio, a synergistic effect of the glass transition temperature of the adhesive layer may be maximized.

The adhesive composition is an initiator for starting a curing reaction, and may further include a cationic initiator. As the cationic initiator, any one starting a cationic reaction by application or radiation of light without limitation, for example, a cationic photoinitiator for starting a cationic reaction by radiation with active energy beams, may be used.

In one example, the cationic photoinitiator may be an onium salt- or organometallic salt-based ionic cationic initiator, or a non-ionic cationic photoinitiator such as an organic silane- or latent sulfonic acid-based cationic photoinitiator or other non-ionic compounds. The onium salt-based initiator may be diaryliodonium salt, triarylsulfonium salt or aryldiazonium salt, the organometallic salt-based initiator may be iron arene, the organic silane-based initiator may be o-nitrobenzyl triaryl silyl ether, triaryl silyl peroxide or acyl silane, and the latent sulfonic acid-based initiator may be α-sulfonyloxy ketone or α-hydroxymethylbenzoin sulfonate. However, the present application is not limited thereto. In addition, as the cationic initiator, a mixture of an iodine-based initiator and a photo sensitizer may be used.

The cationic initiator is an ionized cationic photoinitiator, for example, an onium salt-based ionized cationic photoinitiator. In one example, the cationic initiator is a triacrylsulfonium salt-based ionized cationic photoinitiator. However, the present application is not limited thereto.

The adhesive composition may include 0.01 to 10 parts by weight, for example, 0.1 to 5 parts by weight of the cationic initiator. In this range, the adhesive composition may have excellent curing efficiency and physical properties after curing.

The adhesive composition may further include a photoinitiator as a radical initiator capable of starting a polymerization or crosslinking reaction of an acryl-based monomer. For example, the photoinitiator may be an initiator such as benzoin-based, a hydroxyketone compound, an aminoketone compound or a phosphine oxide compound. In one example, the photoinitiator may be a phosphine oxide compound. In detail, the photoinitiator may be, but is not limited to, benzoin, benzoin methylether, benzoin ethylether, benzoin isopropylether, benzoin n-butylether, benzoin is obutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxy cyclohexylphenylketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylamino benzophenone, dichloro benzophenone, 2-methylanthraquinone, 2-ethylanthraquinone, 2-t-butylanthraquinone, 2-aminoanthraquinone, 2-methyl thioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphineoxide or 2,4,6-trimethylbenzoyl-diphenyl-phosphineoxide.

In the adhesive composition, the photoinitiator may be included at 0.1 to 10 parts by weight, for example, 0.5 to 5 parts by weight, and in this range, effective polymerization and crosslinking may be induced, and degradation in physical properties due to reaction residues may be prevented.

The adhesive composition may also use an initiator generating a radical by absorbing active energy beams having a long wavelength, that is, a long-wavelength photoinitiator, as a radical initiator. Such an initiator may be used alone or in combination with a different kind of initiator.

That is, in the protective film included in the polarizing plate, a UV protector may be mixed to protect the polarizer from UV rays. In this case, when electromagnetic waves are radiated to cure the adhesive composition, electromagnetic waves having a short wavelength, for example, a wavelength of approximately 365 nm or less, are absorbed by the protective film, and thus a suitable curing reaction may not progress. To prevent this problem, the radical initiator may include an initiator capable of generating radicals by absorbing electromagnetic waves having a long wavelength, for example, a wavelength of approximately 365 nm or more.

The long-wavelength photoinitiator may be, for example, diphenyl(2,4,6-trimethylbenzoyl)-phosphineoxide, or bis(2, 4,6-trimethylbenzoyl)-phenylphosphineoxide. For example, Darocur TPO or Irgacure 819 produced by Ciba Specialty Chemicals, Switzerland, may be used, but the present application is not limited thereto.

The adhesive composition may further include an additive such as a photosensitizer, an antioxidant or an attachment enhancing agent, or a known oligomer component to control adhesion performance and brittleness when necessary.

In one example, the adhesive composition may be formulated in a non-solvent type. The non-solvent type composition may mean a kind of adhesive composition not including an organic or water-based solvent component used to dilute components constituting the adhesive composition. As the adhesive composition is formulated in a non-solvent type, a volatilization process for a solvent is not necessary in the formation of the adhesive layer, thickness uniformity may be effectively maintained, and curling of the polarizer may be effectively prevented.

The adhesive composition may have a viscosity of 5 to 1,000 cps at 25° C., for example, 10 to 100 cps. As the viscosity is controlled in this range, process efficiency, ease of controlling thickness and thickness uniformity may be ensured, and physical properties such as adhesive characteristics may be effectively maintained.

A method of forming the adhesive layer on the polarizer using the composition is not particularly limited, and thus, for example, a method of coating an adhesive composition on the polarizer and curing the composition, or coating the adhesive composition on the polarizer, laminating the pressure-sensitive adhesive layer again and curing the coated adhesive composition, may be used. In this case, the curing of the adhesive composition may be performed by a method of radiating active energy beams at a suitable intensity to induce a polymerization or crosslinking reaction of the component in consideration of each component.

The adhesive layer may have a thickness of 0.1 to 30 μm, 1 to 15 μm or 2 to 10 μm. As the thickness of the adhesive layer is controlled to 0.1 μm or more, water resistance of the polarizing plate may be excellently maintained, and when the thickness of the adhesive layer is controlled to 30 μm or less, a thin polarizing plate having a uniform adhesive layer and excellent physical properties may be formed.

In one example, the pressure-sensitive adhesive layer may be a pressure-sensitive adhesive layer having different tensile modulus on both surfaces. That is, in one example, the pressure-sensitive adhesive layer may have first and second surfaces. The first surface may have a higher tensile modulus than the second surface. In such an example, the first surface is directly attached to the adhesive layer. In addition, the second surface may constitute a pressure-sensitive adhesive surface to attach the polarizing plate to the liquid crystal panel.

FIG. 2 exemplifies a pressure-sensitive adhesive layer 2 having first and second surfaces 21 and 22.

As described above, in the pressure-sensitive adhesive layer, when the first surface attached to the polarizer is set to have a higher tensile modulus than that of the second surface, contraction or expansion of the polarizer under severe conditions such as high temperature or high humidity may be inhibited. In addition, as the second surface attaching the polarizing plate to the glass substrate of the liquid crystal panel is set to have a lower tensile modulus than the first surface, the second surface may have excellent wettability with respect to an adherent.

In one example, the first surface may have a tensile modulus at 25° C. of 1 to 1,000 MPa, 10 to 800 MPa, or 100 to 500 MPa. In addition, in one example, the second surface may have a tensile modulus at 25° C. of 0.01 to 0.5 MPa, 0.02 to 0.3 MPa, or 0.03 MPa to 0.2 MPa. As the tensile modulus of the first and second surfaces are controlled within the above-mentioned ranges, the pressure-sensitive adhesive layer may effectively inhibit contraction or expansion of the polarizer under severe conditions, and have excellent wettability to the adherent such as the glass substrate.

A method of constituting the pressure-sensitive adhesive layer having different tensile modulus on both surfaces is not particularly limited. For example, when the pressure-sensitive adhesive layer may be a single-layered pressure-sensitive adhesive layer, the difference in physical properties on both surfaces may be obtained by controlling the curing degree to have a gradient in a thickness direction of the pressure-sensitive adhesive layer. Particularly, such a method is suitable for the case in which the pressure-sensitive adhesive composition constituting the pressure-sensitive adhesive layer is a photo-curable type. For example, in the case of the composition cured by UV radiation, the thickness of a coating layer of the composition before UV radiation or the amount of UV rays radiated is controlled, or UV rays are radiated to the composition in a state in which an UV absorbent or a UV-absorbable functional group is suitably present in the composition, the UV radiation progresses in the thickness direction of the coating layer, and the UV rays are absorbed into the coating layer, thereby forming a gradient of UV radiation according to route. Therefore, the curing degree of the coating layer may be changed according to the gradient formed as described above, and thus it can be realized that the pressure-sensitive adhesive layer has different physical properties on both surfaces. In still another example, the pressure-sensitive adhesive layer may be configured as a pressure-sensitive adhesive layer having a multi-layered structure including at least two pressure-sensitive adhesive layers having different tensile modulus from each other.

For example, as shown in FIG. 3, the pressure-sensitive adhesive layer 3 may include a first pressure-sensitive adhesive layer 31 forming a first surface 21, and a second pressure-sensitive adhesive layer 32 forming a second surface 22, and tensile modulus of the respective pressure-sensitive adhesive layers 31 and 32 may be differently controlled, thereby realizing a pressure-sensitive adhesive layer having different tensile modulus on both surfaces. The pressure-sensitive adhesive layer may be formed in a multi-layered structure such as a double-layered structure as shown in FIG. 3, or at least triple-layered structure in some cases.

Such a pressure-sensitive adhesive layer may have a total thickness, for example, in the range of approximately 10 to 80 μm, 20 to 60 μm, or 30 to 50 μm. As the total thickness of the pressure-sensitive adhesive layer is controlled within the above range, a polarizing plate having a small thickness and excellent physical properties such as durability under severe conditions may be provided. In addition, when the pressure-sensitive adhesive layer is a double-layered structure as shown in FIG. 3, the first pressure-sensitive adhesive layer may have a thickness of 4 to 50 um, and the second pressure-sensitive adhesive layer may have a thickness of 5 to 50 um. As the thickness of the first pressure-sensitive adhesive layer is controlled within a range of 4 to 50 μm, contraction or expansion of the polarizer may be effectively prevented. In addition, as the thickness of the second pressure-sensitive adhesive layer is controlled within a range of 5 to 50 μm, wettability of the pressure-sensitive adhesive layer or durability of the polarizing plate may be effectively maintained. Although the pressure-sensitive adhesive layer is formed in a multi-layered structure, the sum of the thicknesses of the first and second pressure-sensitive adhesive layers may satisfy the above-mentioned range of total thickness.

A method of forming the pressure-sensitive adhesive layer is not particularly limited. For example, the pressure-sensitive adhesive layer may be formed by curing a conventional room temperature-curable, moisture-curable, heat-curable or photocurable pressure-sensitive adhesive composition. In addition, to realize the multi-layered pressure-sensitive adhesive layer, a method of subsequently forming two kinds of pressure-sensitive adhesive layers, or independently forming two kinds of pressure-sensitive adhesive layers and laminating the pressure-sensitive adhesive layers may be used.

In one example, when the pressure-sensitive adhesive layer is formed in a multi-layered structure, the pressure-sensitive adhesive layer disposed at a side of the polarizer, for example, the first pressure-sensitive adhesive layer in the double-layered structure may be a pressure-sensitive adhesive layer composed of a photocurable pressure-sensitive adhesive composition, but the present application is not limited thereto. The term "photocurable pressure-sensitive adhesive composition" may refer to a pressure-sensitive adhesive composition which may be cured by inducing a polymerization or crosslinking reaction by radiation with electromagnetic waves, for example, UV rays or electron beams.

In one example, the pressure-sensitive adhesive layer may include, a so-called, interpenetrating polymer network (hereinafter referred to as "IPN"). The term "IPN" may refer to a state in which at least two kinds of crosslinking structures are present in the pressure-sensitive adhesive layer, and in one example, the crosslinking structure may be present in an entangled, linked or penetrated state. When the pressure-sensitive adhesive layer includes the IPN, a polarizing plate having excellent durability under severe conditions, and excellent workability, optical characteristics and a light leakage preventing ability, may be formed.

When the pressure-sensitive adhesive layer includes the IPN structure, the pressure-sensitive adhesive layer may include, for example, a crosslinking structure of an acryl polymer crosslinked by a multifunctional crosslinking agent, and a crosslinking structure of polymerized multifunctional acrylate.

As the acryl polymer crosslinked by a multifunctional crosslinking agent, for example, an acryl resin having a weight average molecular weight (Mw) of 500,000 or more may be used. Here, the weight average molecular weight (Mw) is a conversion value with respect to reference polystyrene measured by gel permeation chromatography (GPC). In addition, unless particularly defined otherwise in the specification, the term "molecular weight" refers to the "weight average molecular weight." When the molecular weight of the polymer is set to 500,000 or more, a pressure-sensitive adhesive layer having excellent durability under severe conditions may be formed. The upper limit of the molecular weight is not particularly limited, and thus the molecular weight may be controlled within a range of 2,500,000 or less in consideration of durability of the pressure-sensitive adhesive or coatability of the composition.

In one example, the acryl resin may be a polymer including a (meth)acrylic acid ester-based monomer in a polymerization unit.

As the (meth)acrylic acid ester-based monomer, for example, alkyl (meth)acrylate may be used, and in consideration of cohesive strength, glass transition temperature or pressure-sensitive adhesion of the pressure-sensitive adhesive, alkyl (meth)acrylate including an alkyl group having 1 to 14 carbon atoms may be used. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate or tetradecyl (meth)acrylate, which may be used alone or in combination of at least two thereof.

The polymer may further include a crosslinkable monomer in a polymerization unit. The polymer is a polymer including 50 to 99.9 parts by weight of the (meth)acrylic acid ester-based monomer, and 0.1 to 50 parts by weight of the crosslinkable monomer in a polymerized form. Here, the "crosslinkable monomer" refers to a monomer capable of being copolymerized with the (meth)acrylic acid ester-based monomer, which may provide a crosslinkable functional group to a side chain or terminal end of the polymer after copolymerization.

As the crosslinkable monomer, a monomer which may serve to control durability, pressure-sensitive adhesive strength and cohesive strength of the pressure-sensitive adhesive, and to provide, for example, a nitrogen-containing functional group such as a hydroxyl group, a carboxyl group, an epoxy group, an isocyanate group or an amino group to the polymer, and may be copolymerizable with the (meth)acrylic acid ester-based monomer. Various monomers serving as described above are known in the art, and herein all of them may be used. In detail, the crosslinkable monomer may be, but is not limited to, a monomer having a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, a monomer having a carboxyl group such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, a monomer having an epoxy group such as glycidyl (meth)acrylate, or a monomer having nitrogen such as (meth)acrylamide, N-vinyl pyrrolidone or N-vinyl caprolactame, which may be used alone or in combination of at least two thereof.

The acryl polymer may further include a monomer represented by Formula 16 in a polymerization unit.

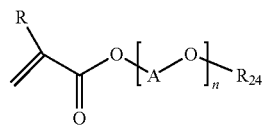

[Formula 16]

In Formula 16, R is hydrogen or an alkyl group, A is alkylene, $R_{24}$ is an alkyl group or an aryl group, and n is a number between 1 and 6.

In the definition of the substituent of Formula 16, the aryl group is an aryl group having 6 to 20 or 6 to 12 carbon atoms, for example, a phenyl group.

The monomer of Formula 16 may be included, for example, at 50 parts by weight or less based on a weight ratio of the above-described (meth)acrylic acid ester-based monomer or crosslinkable monomer, but may be changed depending on purpose.

In the acryl resin, when necessary, a monomer represented by Formula 17 may be further included in a polymerized form. Such a monomer may be added to control the glass transition temperature and provide other functionalities.

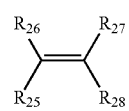

[Formula 17]

In Formula 17, $R_{25}$ and $R_{27}$ are each independently hydrogen or alkyl, $R_{28}$ is cyano, phenyl unsubstituted or substituted with alkyl, acetyloxy or $COR_{29}$, and here $R_{29}$ is amino or glycidyloxy, which is unsubstituted or substituted with alkyl or alkoxyalkyl.

The monomer of Formula 17 may be included at 20 parts by weight or less based on the weight of the (meth)acrylic acid ester-based monomer or crosslinkable monomer, but may be changed depending on purpose.

The acryl resin may be prepared by applying a mixture of monomers including the above-mentioned components to a conventional polymerization method such as solution polymerization, photopolymerization, bulk polymerization, suspension polymerization or emulsion polymerization.

In the pressure-sensitive adhesive layer, as a multifunctional crosslinking agent crosslinking the acryl polymer, a general crosslinking agent such as an isocyanate crosslinking agent, an epoxy crosslinking agent, an aziridin crosslinking agent, or a metal chelate crosslinking agent may be used. In one example, an isocyanate crosslinking agent is used, but the present application is not limited thereto. As the isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting the multifunctional isocyanate compound with a polyol compound such as trimethylol propane, may be used. As the epoxy crosslinking agent, at least one selected from the group consisting of ethyleneglycol diglycidylether, triglycidylether, trimethylolpropane triglycidylether, N,N,N',N'-tetraglycidyl ethylenediamine and glycerin diglycidylether may be used, and as the aziridine crosslinking agent, at least one selected from the group consisting of N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine) and tri-1-aziridinylphosphine oxide may be used, but the present application is not limited thereto. In addition, as the metal chelate crosslinking agent, a compound in which a polyvalent metal such as aluminum, iron, zinc, tin, titanium, antimony, magnesium and/or vanadium is (are) coordinated to acetyl acetone or ethyl acetoacetate may be used, but the present application is not limited thereto.

The multifunctional crosslinking agent may be included in the pressure-sensitive adhesive, for example, at 0.01 to 10 parts by weight, or 0.01 to 5 parts by weight, based on 100 parts by weight of the acryl polymer described above. In this range, the pressure-sensitive adhesive may maintain excellent cohesive strength and durability.

The multifunctional crosslinking agent may crosslink the polymer by reaction with a crosslinkable functional group of the acryl polymer in the formation of the pressure-sensitive adhesive layer such as an aging process.

In the pressure-sensitive layer having the IPN structure, a crosslinking structure realized by polymerized multifunctional acrylate may be included together with a crosslinking structure realized by an acryl polymer crosslinked by the multifunctional crosslinking agent.

As the multifunctional acrylate, a compound having at least two (meth)acryloyl groups in a molecule may be used without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane (meth)acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

The multifunctional acrylate may be used alone or in combination of at least two thereof. The acrylate having a molecular weight of less than 1,000 and tri- or more functional acrylate may be used in an aspect of realizing the durability, but the present application is not limited thereto.

The multifunctional acrylate may include a ring structure among backbone structures. As such an acrylate is used, contraction or expansion of the polarizer may be more effectively prevented, and light leakage preventing effects may be enhanced. The ring structure included in the multifunctional acrylate may be a carbocyclic or heterocyclic structure, or a monocyclic or polycyclic structure. The multifunctional acrylate may be, but is not limited to, a monomer having an isocyanurate structure such as tris (meth)acryloxy ethyl isocyanuarate or a hexafunctional acrylate such as isocyanate-modified urethane (meth)acrylate (e.g., a reaction product of an isocyanate monomer and trimethylolpropane tri(meth)acrylate).

The multifunctional acrylate may be included in the pressure-sensitive adhesive layer at 20 to 200 parts by weight based on 100 parts by weight of the acryl polymer, and thus the tensile modulus of the pressure-sensitive adhesive layer may be more effectively controlled and excellent durability may be maintained.

The pressure-sensitive adhesive layer may further include a silane coupling agent. The silane coupling agent serves to enhance cohesion and adhesion stability of the pressure-sensitive adhesive, improve thermal resistance and humidity resistance, and enhance adhesion reliability even when the pressure-sensitive adhesive is left under severe conditions for a long time. For example, the silane coupling agent may be, γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, acetoacetatepropyl triethoxy silane, β-cyanoacetyl trimethoxy silane, β-cyanoacetyl triethoxy silane, or acetoxyacetotrimethoxy silane, which may be used alone or in combination of at least two thereof. In the present application, a silane-based coupling agent having an acetoacetate or β-cyanoacetyl group is used, but the present application is not limited thereto. In the pressure-sensitive adhesive layer, the silane coupling agent may be included at 0.01 to 5 parts by weight, for example, 0.01 to 1 part by weight based on 100 parts by weight of the acryl resin, and thus pressure-sensitive adhesive strength and durability may be effectively maintained.

The pressure-sensitive adhesive layer may further include a tackifier resin. The tackifier resin may be a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin, which may be used alone or in combination of at least two thereof. The tackifier resin may be included at 1 to 100 parts by weight based on 100 parts by weight of the acryl resin.

The pressure-sensitive adhesive layer may further include at least one additive selected from the group consisting of an epoxy resin, a curing agent, a UV stabilizer, an antioxidant, a coloring agent, a reinforcing agent, a filler, a foaming agent, a surfactant and a plasticizer as long as it does not affect the desired effect.

A method of forming the above-described pressure-sensitive adhesive layer is not particularly limited. For example, the pressure-sensitive adhesive layer may be formed by a method of preparing a pressure-sensitive adhesive composition by mixing the components described above, coating the pressure-sensitive adhesive composition on a suitable process base using a conventional means such as a bar coater or a comma coater, and curing the composition. In addition, a method of curing the pressure-sensitive adhesive composition is not particularly limited, and for example, the composition may be cured by sequentially or simultaneously performing a method of aging the composition at a suitable temperature such that a crosslinking reaction of the acryl resin and the multifunctional crosslinking agent may progress and a process of radiating electromagnetic waves to enable the multifunctional acrylate to be polymerized. The radiation with electromagnetic waves may be performed using a means such as a high pressure mercury lamp, an electrodeless lamp or a xenon lamp. In addition, conditions for radiating electromagnetic waves are not particularly limited, as long as the conditions are controlled to appropriately perform the polymerization of the multifunctional acrylate without degrading all the physical properties. For example, the radiation with electromagnetic waves may be performed for a suitable time by controlling the luminance to 50 to 2,000 mW/cm$^2$ and intensity of radiation with 10 to 1,000 mJ/cm$^2$.

In consideration of the efficiency of the curing process by the radiation with electromagnetic waves, a photoinitiator may be included in the pressure-sensitive adhesive composition. As the photoinitiator, any one that can generate radicals by the radiation with electromagnetic waves and start the curing reaction may be used without particular limitation. For example, the photoinitiator may be benzoin, benzoin methylether, benzoin ethylether, benzoin isopropylether, benzoin n-butylether, benzoin is obutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone] or 2,4,6-trimethylbenzoyl-diphenyl-phosphineoxide, which may be used alone or in combination of at least two thereof, but the present application is not limited thereto.

The photoinitiator may be included at 0.2 to 20 parts by weight, 0.2 to 10 parts by weight, or 0.2 to 5 parts by weight based on 100 parts by weight of the acryl polymer. The photoinitiator may be included at 0.2 to 20 parts by weight based on 100 parts by weight of the multifunctional acrylate. According to such control, reaction of the multifunctional acrylate may be effectively induced, and degradation in physical properties of the pressure-sensitive adhesive due to remaining components after curing may be prevented.

The pressure-sensitive adhesive layer may also be formed using a heat-curable or room temperature-curable pressure-sensitive adhesive composition, and in this case, the pressure-sensitive adhesive layer may include an acryl polymer crosslinked by a multifunctional crosslinking agent.

The acryl resin may be the same kind as that used in the above-described photocurable composition. In one example, the acryl resin may be a polymer including 80 to 99.9 parts by weight of a (meth)acrylic acid ester-based monomer, and 0.1 to 20 parts by weight of a crosslinkable monomer in a polymerization unit. Here, specific kinds of the (meth)acrylic acid ester-based monomer and the crosslinkable monomer or the method of preparing the polymer are the same as described above. In addition, the polymer may also include the monomer represented by Formula 16 or 17.

In addition, as the multifunctional crosslinking agent crosslinking the acryl resin in the pressure-sensitive adhesive layer, an isocyanate crosslinking agent, an epoxy crosslinking agent, an aziridine crosslinking agent or a metal chelate crosslinking agent may also be used as described above. Such a crosslinking agent may be included at a suitable content within a range of 0.01 to 10 parts by weight, for example, 0.01 to 5 parts by weight based on 100 parts by weight of the acryl resin in consideration of the tensile modulus, durability and cohesion of the pressure-sensitive adhesive layer.

The method of forming the pressure-sensitive adhesive layer as described above is similar to that for the photocurable pressure-sensitive adhesive described above, except that the curing process by radiation with electromagnetic waves is not performed. That is, the pressure-sensitive adhesive layer may be formed by preparing the pressure-sensitive adhesive composition by suitably mixing necessary components, coating the composition on a suitable base, and curing the composition. The heat-curable pressure-sensitive adhesive composition may further include at least one additive selected from the group consisting of a silane coupling agent, a tackifier resin, an epoxy resin, a curing agent, a UV stabilizer, an antioxidant, a coloring agent, a reinforcing agent, a filler, a foaming agent, a surfactant and a plasticizer when necessary.

When the pressure-sensitive adhesive layer is formed in a multi-layered structure having at least two layers, the pressure-sensitive adhesive layer constituting the multi-layered structure may be suitably selected from, for example, the same or different kinds of the above-described pressure-sensitive adhesive layers. Meanwhile, as described above, the pressure-sensitive adhesive disposed to the side of the polarizer and attached to the polarizer may be formed of a photocurable pressure-sensitive adhesive composition.

The polarizing plate may further include a protective film attached to one surface of the polarizer, specifically, a surface of the polarizer opposite to the surface to which the pressure-sensitive adhesive layer is attached. As the protective film, a cellulose-based film such as a TAC film; a polyester-based film such as a poly(ethylene terephthalate)) (PET) film; a polycarbonate-based film; a polyestersulfone-based film; or a polyolefin-based film such as an acryl-based film and/or a polyethylene film, a polypropylene film, a cyclic polyolefin film or polyolefin film having a norbornene structure or an ethylene-propylene copolymer film, may be used, but the present application is not limited thereto. The protective film may be attached to the polarizer by means of, for example, the adhesive layer described above.

The polarizing plate may further include a releasing film attached under the pressure-sensitive adhesive layer. As the releasing film, a conventional component known in the art may be employed.

The polarizing plate may further include at least one functional layer selected from the group consisting of an anti-reflection layer, an anti-glare layer, a phase retardation plate, a wide viewing angle compensation film and a brightness enhancement film when necessary.

The exemplary LCD device of the present application may include a liquid crystal panel and the polarizing plate attached to one or both surfaces of the liquid crystal panel.

The kind of liquid crystal panel included in the LCD device is not particularly limited. For example, a known panel such as a passive matrix-type panel such as a twisted nematic (TN), super twisted nematic (STN), ferroelectric (F) or polymer dispersed (PD) panel; an active matrix-type panel such as a two or three terminal panel; an in-plane switching (IPS) panel; or a vertically-aligned (VA) panel, may be used without limitation.

In addition, kinds of other components constituting the LCD device, for example, upper and lower substrates (e.g., a color filter substrate or an array substrate) are not particularly limited, either, and any components known in the art may be employed without limitation.

Advantageous Effect

An exemplary polarizing plate has lighter weight, a smaller thickness, and excellent physical properties such as water resistance, workability, durability, and light leakage preventing ability. In addition, one exemplary polarizing plate does not induce curling occurring at the polarizing plate or a polarizer in formation thereof, and has excellent thermal resistance or thermal shock resistance.

BRIEF DESCRIPTION OF THE DRAWINGS

FIG. 1 is a diagram showing a structure of an exemplary polarizing plate;

FIGS. 2 and 3 are cross-sectional views showing exemplary pressure-sensitive adhesive layers of the present application; and FIG. 4 is a schematic diagram showing a method of evaluating curling characteristics.

DETAILED DESCRIPTION OF EXEMPLARY EMBODIMENTS

Hereinafter, the present application will be described with reference to Examples according to the present application and Comparative Examples not according to the present application in detail. However, the scope of the present application is not limited to the following Examples.

Preparation Example 1. Preparation of Acryl Resin (A)

63 parts by weight of n-butyl acrylate (n-BA), 2 parts by weight of 2-hydroxyethyl acrylate (2-HEA) and 35 parts by weight of 2-methoxyethyl acrylate were put into a 1 L reactor refluxing nitrogen gas and equipped with a cooling device to facilitate temperature control. Subsequently, 0.04 parts by weight of n-dodecyl mercaptan (n-DDM) as a molecular weight controlling agent, based on 100 parts by weight of the monomer, and ethyl acetate (EAc) as a solvent were put into the reactor, and then the resulting mixture was purged with nitrogen gas for 60 minutes to remove oxygen. Afterward, the temperature was maintained at 64° C., 0.05 parts by weight of azobisisobutyronitrile (AIBN) as a reaction initiator, based on 100 parts by weight of the monomer, was put into the reactor, and the reaction was carried out for 7 hours. After the reaction, the reaction product was diluted with ethyl acetate, and thus an acryl resin (A) having a weight average molecular weight of 550,000 was prepared.

Preparation Example 2. Preparation of Acryl Resin (B)

99 parts by weight of n-butyl acrylate (n-BA) and 2 parts by weight of 2-hydroxyethyl acrylate (2-HEA) were put into a 1 L reactor refluxing nitrogen gas and equipped with a cooling device to facilitate temperature control. Subsequently, ethyl acetate (EAc) as a solvent was put into the reactor, and then the resulting mixture was purged with nitrogen gas for 60 minutes to remove oxygen. Afterward, the temperature was maintained at 64° C., 0.05 parts by weight of azobisisobutyronitrile (AIBN) as a reaction initiator, based on 100 parts by weight of the monomer, was put into the reactor, and the reaction was carried out for 7 hours. After the reaction, the reaction product was diluted with ethyl acetate, and thus an acryl resin (B) having a weight average molecular weight of 1,800,000 was prepared.

Preparation Example 3. Preparation of Adhesive Composition (A)

An adhesive composition having a glass transition temperature of 52° C. was prepared by mixing 38.5 parts by weight of 2-hydroxylethyl acrylate (2-HEA), 10 parts by weight of phenoxyethyl acrylate, 15 parts by weight of isobornyl acrylate, and 15 parts by weight of Celloxide 2021P, which is an epoxy resin, and 15 parts by weight of 1,4-cyclohexane dimethanol diglycidyl ether (CHDMGDE, Hajin Chemtech) as epoxy compounds, and mixing 3 parts by weight of a radical initiator (CGI 819, bis(2,4,6-trimethylbenzoyl)-phenylphosphineoxide), 3 parts by weight of an iodide initiator (Irgacure 250, Ciba Specialty Chemicals) as a cationic initiator, and 0.5 parts by weight of a photosensitizer (isopropyl thioxanthone, Aldrich) with the mixed product.

Preparation Example 4. Preparation of Adhesive Composition (B)

An adhesive composition having a glass transition temperature of 54° C. was prepared by mixing 44.5 parts by weight of 2-hydroxylethyl acrylate (2-HEA), 15 parts by weight of phenoxyethyl acrylate, 9 parts by weight of isobornyl acrylate, 15 parts by weight of Celloxide 2021P, which is an epoxy resin and 10 parts by weight of a novolac epoxy resin having a molecular weight of 3,000, poly [(phenyl glycidyl ether)-co-formaldehyde] as epoxy compounds, and mixing 3 parts by weight of a radical initiator (CGI 819, bis(2,4,6-trimethylbenzoyl)-phenylphosphineoxide), 3 parts by weight of an iodide initiator (Irgacure 250, Ciba Specialty Chemicals) as a cationic initiator, and 0.5 parts by weight of a photosensitizer (isopropyl thioxanthone, Aldrich) with the mixed product.

Preparation Example 5. Preparation of Adhesive Composition (C)

An adhesive composition having a glass transition temperature of 61° C. was prepared by mixing 15 parts by weight of 2-hydroxylethyl acrylate (2-HEA), 20 parts by weight of phenoxyethyl acrylate, 9.5 parts by weight of isobornyl acrylate, and 25 parts by weight of Celloxide 2021P, which is an epoxy resin, and 24 parts by weight of 1,4-cyclohexane dimethanol diglycidyl ether (CHDMGDE, Hajin Chemtech) as epoxy compounds, and mixing 3 parts by weight of a radical initiator (CGI 819, bis(2,4,6-trimethylbenzoyl)-phenylphosphineoxide), 3 parts by weight of an iodide initiator (Irgacure 250, Ciba Specialty Chemicals) as a cationic initiator, and 0.5 parts by weight of a photosensitizer (isopropyl thioxanthone, Aldrich) with the mixed product.

Preparation Example 6. Preparation of Adhesive Composition (D)

An adhesive composition having a glass transition temperature of 69° C. was prepared by mixing 20 parts by weight of 2-hydroxylethyl acrylate (2-HEA), 13 parts by weight of phenoxyethyl acrylate, 9.5 parts by weight of isobornyl acrylate, and 28 parts by weight of Celloxide 2021P, which is an epoxy resin, and 23 parts by weight of 1,4-cyclohexane dimethanol diglycidyl ether (CHDMGDE, Hajin Chemtech) as epoxy compounds, and mixing 3 parts by weight of a radical initiator (CGI 819, bis(2,4,6-trimethylbenzoyl)-phenylphosphineoxide), 3 parts by weight of an iodide initiator (Irgacure 250, Ciba Specialty Chemicals) as a cationic initiator, and 0.5 parts by weight of a photosensitizer (isopropyl thioxanthone, Aldrich) with the mixed product.

Preparation Example 7. Preparation of Adhesive Composition (E)

An adhesive composition having a glass transition temperature of 80° C. was prepared by mixing 23 parts by weight of 2-hydroxylethyl acrylate (2-HEA), 10 parts by weight of phenoxyethyl acrylate, 8 parts by weight of isobornyl acrylate, 26 parts by weight of Celloxide 2021P, which is an epoxy resin, 13 parts by weight of 1,4-cyclohexane dimethanol diglycidyl ether (CHDMGDE, Hajin Chemtech) and 14 parts by weight of a novolac epoxy resin having a molecular weight of 3,000, poly[(phenyl glycidyl ether)-co-formaldehyde] as epoxy compounds, and mixing 3 parts by weight of a radical initiator (CGI 819, bis(2,4,6-trimethylbenzoyl)-phenylphosphineoxide) and 3 parts by weight of an iodide initiator (Irgacure 250, Ciba Specialty Chemicals) as a cationic initiator with the mixed product.

Preparation Example 8. Preparation of Adhesive Composition (F)

An adhesive composition having a glass transition temperature of 112° C. was prepared by mixing 18 parts by weight of 2-hydroxylethyl acrylate (2-HEA), 12 parts by weight of isobornyl acrylate, and 39 parts by weight of Celloxide 2021P, which is an epoxy resin, and 24.5 parts by weight of 1,4-cyclohexane dimethanol diglycidyl ether (CHDMGDE, Hajin Chemtech) as epoxy compounds, and mixing 3 parts by weight of a radical initiator (CGI 819, bis(2,4,6-trimethylbenzoyl)-phenylphosphineoxide), 3 parts by weight of an iodide initiator (Irgacure 250, Ciba Specialty Chemicals) as a cationic initiator, and 0.5 parts by weight of a photosensitizer (isopropyl thioxanthone, Aldrich) with the mixed product.

Preparation Example 9. Preparation of Adhesive Composition (G)

An adhesive composition having a glass transition temperature of 112° C. was prepared by mixing 51.5 parts by weight of Celloxide 2021P, which is an epoxy resin, and 45 parts by weight of 1,4-cyclohexane dimethanol diglycidyl ether (CHDMGDE, Hajin Chemtech) as an epoxy compound, and mixing 3 parts by weight of an iodide initiator (Irgacure 250, Ciba Specialty Chemicals) as a cationic initiator and 0.5 parts by weight of a photosensitizer (isopropyl thioxanthone, Aldrich) with the mixed product.

Preparation Example 10. Preparation of Adhesive Composition (H)

An adhesive composition having a glass transition temperature of 25° C. was prepared by mixing 55 parts by weight of 2-hydroxylethyl acrylate (2-HEA), 20 parts by weight of phenoxyethyl acrylate, 15 parts by weight of isobornyl acrylate, and 5 parts by weight of a novolac epoxy resin having a molecular weight of 3,000, poly[(phenyl glycidyl ether)-co-formaldehyde] as an epoxy compound, and mixing 4 parts by weight of a radical initiator (TPO, Darocure TPO) and 1 part by weight of IHT-PI43 (including 50% mixed triarylsulfonium hexafluorophosphate salt and 50% Propylene carbonate) as a cationic initiator with the mixed product.

Preparation Example 11. Preparation of Adhesive Composition (I)

An adhesive composition having a glass transition temperature of 40° C. was prepared by mixing 46 parts by weight of 2-hydroxylethyl acrylate (2-HEA), 20 parts by weight of phenoxyethyl acrylate, 15 parts by weight of isobornyl acrylate, and 5 parts by weight of a novolac epoxy resin having a molecular weight of 3,000, poly[(phenyl glycidyl ether)-co-formaldehyde] as a cationic reactive compound, and mixing 4 parts by weight of a radical initiator (TPO, Darocure TPO), 3 parts by weight of an iodine salt as a cationic polymerization initiator, and 2 parts by weight of a photosensitizer (diethyl thioxanthone, Kayacure DTEX-S, Nippon Kayaku Co. Ltd.) with the mixed product.

Preparation Example 12. Preparation of Adhesive Composition (J)

An adhesive composition having a glass transition temperature of 24° C. was prepared by mixing 68.5 parts by weight of 2-hydroxylethyl acrylate (2-HEA), 12 parts by weight of phenoxyethyl acrylate, and 15 parts by weight of isobornyl acrylate, and mixing 4 parts by weight of a radical initiator (CGI 819, bis(2,4,6-trimethylbenzoyl)-phenylphosphineoxide) and 0.5 parts by weight of a photosensitizer (isopropyl thioxanthone, Aldrich) with the mixed product.

The compositions and glass transition temperatures of the prepared adhesive compositions are listed in Table 1.

TABLE 1

| | | | Adhesive composition | | | | | | | | | |
|---|---|---|---|---|---|---|---|---|---|---|---|---|
| | | | A | B | C | D | E | F | G | H | I | J |
| Composition (parts by weight) | Acryl-based monomer | 2-HEA | 38.5 | 44.5 | 15 | 20 | 23 | 18 | 0 | 55 | 46 | 68.5 |
| | | PEA | 10 | 15 | 20 | 13 | 10 | 0 | 0 | 20 | 10 | 12 |
| | | IBOA | 15 | 9 | 9.5 | 9.5 | 8 | 12 | 0 | 15 | 30 | 15 |
| | Epoxy compound | 2021P | 15 | 15 | 25 | 28 | 26 | 39 | 51.5 | 0 | 0 | 0 |
| | | CHDMDGDE | 15 | 0 | 24 | 23 | 13 | 24.5 | 45 | 0 | 0 | 0 |
| | | Novolac | 0 | 10 | 0 | 0 | 14 | 0 | 0 | 5 | 5 | 0 |
| | Radical initiator | | 3 | 3 | 3 | 3 | 3 | 3 | 0 | 4 | 4 | 4 |
| | Photoinitiator | | 3 | 3 | 3 | 3 | 3 | 3 | 3 | 1 | 3 | 0 |
| | Photosensitizer | | 0.5 | 0.5 | 0.5 | 0.5 | 0 | 0.5 | 0.5 | 0 | 2 | 0.5 |
| Glass transition temperature (° C.) | | | 52 | 54 | 61 | 69 | 80 | 97 | 112 | 25 | 40 | 24 |

2-HEA: 2-hydroxyethyl acrylate
PEA: phenoxyethyl acrylate
IBOA: isobornyl acrylate
2021P: Celloxide 2021P
CHDMDGDE: 1,4-cyclohexanedimethanol diglycidylether
Novolac: poly[(phenyl glycidyl ether)-co-formaldehyde]

Example 1

Preparing First Pressure-Sensitive Adhesive Layer

A first pressure-sensitive adhesive composition was prepared by mixing 100 parts by weight of the acryl resin (A), 80 parts by weight of pentaerythritol triacrylate as a multifunctional acrylate, 3 parts by weight of 2-hydroxy-2-methylphenylpropane-1-one as a photoinitiator, 5 parts by weight of a crosslinking agent (TDI-based isocyanate, Coronate L, Nippon Polyurethane Industry (Japan)) and 0.1 parts by weight of a silane coupling agent (KBM-403, Shin-Etsu (Japan), γ-glycidoxypropyltrimethoxy silane), diluting the mixed product with a solvent to having a solid content of 35 wt %, and uniformly mixing the resulting product. Subsequently, the prepared pressure-sensitive adhesive composition was coated on a surface of a poly(ethylene terephthalate) (PET) film (thickness: 38 μm, MRF-38, Mitsubishi) treated with releasing treatment with a silicon compound to have a dry thickness of 25 μm, and the resulting film was dried in an oven at 110° C. for 3 minutes. Then, the releasing-treated surface of PET film subjected to releasing treatment (thickness: 38 μm, MRF-38, Mitsubishi) was further laminated on the dried coating layer, and UV rays were radiated under the following conditions, thereby forming a first pressure-sensitive adhesive layer. Tensile modulus (at 25° C.) of the formed first pressure-sensitive adhesive layer was 400 MPa. In the embodiment, the tensile modulus was measured according to the following method.
 <Conditions for UV Radiation>
 UV Radiation Tool: High Pressure Mercury Lamp
 Radiation Conditions:
 Luminance: 600 mW/cm$^2$
 Intensity of Radiation: 150 mJ/cm$^2$
 Preparing Second Pressure-Sensitive Adhesive Layer A first pressure-sensitive adhesive composition was prepared by mixing 100 parts by weight of the acryl resin (B), 15 parts by weight of pentaerythritol triacrylate as a multifunctional acrylate, 3 parts by weight of 2-hydroxy-2-methylphenylpropane-1-one as a photoinitiator, 0.5 parts by weight of a crosslinking agent (TDI-based isocyanate, Coronate L, Nippon Polyurethane Industry (Japan)) and 0.1 parts by weight of a silane coupling agent (KBM-403, Shin-Etsu (Japan), γ-glycidoxypropyltrimethoxy silane), diluting the mixed product with a solvent to having a solid content of 13 wt %, and uniformly mixing the resulting product. Subsequently, the prepared pressure-sensitive adhesive composition was coated on a surface of a poly(ethylene terephthalate) (PET) film (thickness: 38 μm, MRF-38, Mitsubishi) treated with releasing treatment with a silicon compound to have a dry thickness of 25 μm, and the resulting film was dried in an oven at 110° C. for 3 minutes. Then, the releasing-treated surface of the releasing-treated PET film (thickness: 38 μm, MRF-38, Mitsubishi) was further laminated on the dried coating layer, and UV rays were radiated under the following conditions, thereby forming a second pressure-sensitive adhesive layer. Tensile modulus (at 25° C.) of the formed second pressure-sensitive adhesive layer was 0.2 MPa.
 <Conditions for UV Radiation>
 UV Radiation Tool: High Pressure Mercury Lamp
 Radiation Conditions:
 Luminance: 600 mW/cm$^2$
 Intensity of Radiation: 150 mJ/cm$^2$
 Preparing Polarizing Plate A double-layered pressure-sensitive adhesive layer was formed by laminating the first and second pressure-sensitive adhesive layers formed above using a laminator, and a polarizing plate was formed using the pressure-sensitive adhesive layer. The sequence of forming the polarizing plate was as follows. First, a polarizer was formed by elongating a polyvinylalcohol-based resin film, staining the film with iodine, and treating the resulting film with a boric acid aqueous solution. Subsequently, a 60 μm-thick acryl film (formed by extruding and elongating a mixture including a phenoxy resin, polystyrene and polymethylmethacrylate) as a protective film was laminated on one surface of a polarizer formed by elongating a polyvinylalcohol-based resin film, dying the film with iodine and treating the film with a boric acid aqueous solution using the prepared adhesive composition (A). Afterward, the adhesive composition (A) was used having a thickness after curing of 5 μm during lamination. In addition, the adhesive composition (A) was coated on a surface of the polarizer to which the acryl film was not attached to have a thickness after curing of 5 μm. A polarizing plate was formed by laminating the first pressure-sensitive adhesive layer of the double-layered pressure-sensitive adhesive layer by means of a coating layer of the coated adhesive composition (A), and curing the coating layer by UV radiation under the following conditions (the structure of the polarizing plate: acryl film 4 active energy beam-curable adhesive layer→polarizer→active energy beam-curable adhesive layer→first pressure-sensitive adhesive layer→second pressure-sensitive adhesive layer→PET releasing film). UV radiation may be performed to a side of the acryl film, a side of the double-layered pressure-sensitive adhesive layer or the both sides.

<Conditions for UV Radiation>
UV Radiation Tool: High Pressure Mercury Lamp
Radiation Conditions:
Luminance: 800 mW/cm$^2$
Intensity of Radiation: 2,000 mJ/cm$^2$ Example 2

A polarizing plate was formed as described in Example 1, except that a TAC film having a thickness of 60 μm was used as a protective film instead of the acryl film.

Example 3

A polarizing plate was formed as described in Example 1, except that lamination conditions were controlled such that the adhesive composition was coated to have a thickness after curing of 10 μm.

Example 4

A polarizing plate was formed as described in Example 1, except that lamination conditions were controlled such that the adhesive composition was coated to have a thickness after curing of 20 μm.

Example 5

A polarizing plate was formed as described in Example 1, except that the adhesive composition was coated to have a thickness after curing of 0.15 μm.

Example 6

A polarizing plate was formed as described in Example 1, except that the adhesive composition (B) was used as an adhesive composition.

Example 7

A polarizing plate was formed as described in Example 1, except that the adhesive composition (C) was used as an adhesive composition.

Example 8

A polarizing plate was formed as described in Example 1, except that the adhesive composition (D) was used as an adhesive composition.

Example 9

A polarizing plate was formed as described in Example 1, except that the adhesive composition (E) was used as an adhesive composition.

Example 10

A polarizing plate was formed as described in Example 1, except that the adhesive composition (F) was used as an adhesive composition.

Example 11

A polarizing plate was formed as described in Example 1, except that the adhesive composition (G) was used as an adhesive composition.

Comparative Example 1

A polarizing plate was formed as described in Example 1, except that the first pressure-sensitive adhesive layer was formed to have a thickness of 5 μm, and the second pressure-sensitive adhesive layer was formed to have a thickness of 3 μm in the formation of the pressure-sensitive adhesive layer.

Comparative Example 2

A polarizing plate was formed as described in Example 1, except that lamination conditions were controlled such that the adhesive composition was coated to have a thickness after curing of 0.08 μm.

Comparative Example 3

A polarizing plate was formed as described in Example 1, except that lamination conditions were controlled such that the adhesive composition was coated to have a thickness after curing of 32 μm.

Comparative Example 4

A polarizing plate was formed as described in Example 1, except that a TAC film having a thickness of 60 μm was used as a protective film instead of the acryl film, a water-based polyvinylalcohol-based adhesive composition generally used to attach a protective film, as an adhesive attaching the TAC film to the polarizer, was coated to have a dry thickness of 0.1 μm, the water-based polyvinylalcohol-based adhesive composition was coated, the protective film was laminated and dried in an oven at 80° C. for 5 minutes, and the double-layered pressure-sensitive adhesive layer was laminated using the active energy beam-curable adhesive composition.

Comparative Example 5

A polarizing plate was formed as described in Comparative Example 1, except that the adhesive composition (H) was used as an adhesive composition.

Comparative Example 6

A polarizing plate was formed as described in Comparative Example 1, except that the adhesive composition (I) was used as an adhesive composition.

Comparative Example 7

A polarizing plate was formed as described in Comparative Example 1, except that the adhesive composition (J) was used as an adhesive composition.

<Evaluation of Physical Properties>

1. Evaluation of Tensile Modulus

Herein, tensile modulus of a pressure-sensitive adhesive layer was measured by a stress-strain test due to tensile according to a method defined in ASTM D638, or when it was difficult to directly measure the tensile modulus, a storage modulus was measured and then converted into the tensile modulus by the following Conversion Formula. In detail, a sample having a stacked structure having a PET releasing film (thickness: 38 μm, MRF-38), a pressure-sensitive adhesive layer and a PET releasing film (thickness: 38 μm, MRF-38), which was formed in Example or Comparative Example, was cut into a dog bone-type specimen in the size of 7 cm (length)×1 cm (width), both ends of the specimen were fixed with jigs for a tensile test, and tensile modulus was measured according to ASTM D638. The conditions for measuring the tensile modulus were as follows.

<Conditions for Measuring Tensile Modulus>
Measuring Apparatus: Universal Testing Machine (UTM)
Equipment Model: Zwick Roell Z010, Instron
Measurement Conditions:
Load Cell: 500 N
Tensile Rate: 3 mm/sec <Measurement of Storage Modulus and Conversion into Tensile Modulus>

A pressure-sensitive adhesive layer was cut into 5 pieces in the size of 15 cm×25 cm×25 μm (width×length×thickness), and the cut pieces were stacked in five layers. Subsequently, the stacked pressure-sensitive adhesive layers were cut in a circle having a diameter of 8 mm, and pressed using glasses overnight to enhance wettability at an interface between the layers, thereby removing air bubbles generated during stacking. As a result, a sample was prepared. Subsequently, the sample was placed on a parallel plate, and a gap was adjusted. Then, after Normal & Torque was adjusted to zero, and stabilization of normal force was checked, a storage modulus was measured under the following conditions, and the tensile modulus was calculated according to the following Expression.

Measurement Apparatus and Measuring Conditions
Measurement Apparatus: ARES-RDA, TA Instruments Inc. with forced convection oven
Measuring Conditions:
Geometry: 8 mm parallel plate
Gap: around 1 mm
Test Type: dynamic strain frequency sweep
Strain=10.0[%], temperature: 30° C.
Initial Frequency: 0.4 rad/s, final frequency: 100 rad/s <Conversion Formula>
E=3G
In Conversion Formula, E is a tensile modulus, and G is a storage modulus.

2. Evaluation of Durability and Reliability

A sample was prepared by attaching a specimen prepared by cutting a polarizing plate in the size of 180 mm×250 mm (width×length) to a 19-inch panel commercially available using a laminator. Pressure applied in attachment was approximately 5 Kg/cm², and the attachment was performed in a clean room to prevent generation of bubbles or impurities at an interface between the specimen and the panel. Afterward, the panel was compressed in an autoclave (50° C. and 5 atm) for approximately 30 minutes, and then stored under a constant temperature and humidity condition (23° C. and relative humidity: 50%) for 24 hours. Subsequently, the formed sample was left under conditions of a temperature of 60° C. and relative humidity of 90% for 100 hours, followed by the evaluation of humidity and thermal resistance by observing whether bubbles or peeling were or were not generated at the pressure-sensitive interface. In addition, the formed sample was left under conditions of a temperature of 90° C. for 100 hours, followed by the evaluation of thermal resistance by observing whether bubbles or peeling were or were not generated at the pressure-sensitive adhesive interface. The formed sample was left at room temperature for 24 hours right before the evaluation of humidity and thermal resistance or thermal resistance. Evaluation conditions were as follows:

<Criteria for Evaluation of Durability and Reliability>
○: No air bubbles and peeling were generated.
Δ: Air bubbles and/or peeling were somewhat generated.
x: Air bubbles and/or peeling were considerably generated.

3. Evaluation of Water Resistance

A sample was prepared by attaching a specimen prepared by cutting a polarizing plate in the size of 180 mm×130 mm (width×length) to a glass substrate (soda lime glass). Subsequently, the formed sample was put into water at 60° C., left for 24 hours, and observed for bubbles or peeling to evaluate water resistance according to the following criteria. The formed sample was left at room temperature for 24 hours right before the evaluation of water resistance. The evaluation conditions were as follows:

<Criteria for Evaluation of Water Resistance>
○: No air bubbles and peeling were generated at an interface between the adhesive layer and the pressure-sensitive adhesive layer.
Δ: Some bubbles and/or peeling were generated at an interface between the adhesive layer and the pressure-sensitive adhesive layer.
x: Bubbles and/or peeling were considerably generated at an interface between the adhesive layer and the pressure-sensitive adhesive layer.

4. Evaluation of Thermal Shock Resistance

A sample was prepared by attaching a specimen prepared by cutting a polarizing plate in the size of 100 mm×100 mm (width×length) to a glass substrate (soda lime glass). Subsequently, the formed sample was compressed in an autoclave at 50 C and 5 atm for 30 minutes and put in a thermal shock chamber, followed by the evaluation of physical properties. Thermal shock resistance was evaluated by repeating a process of leaving the compressed sample at −30° C. for 30 minutes and leaving the sample at 70° C. for 30 more minutes 100 cycles, and observing whether cracks were generated in an MD direction of a polarizer. The evaluation was performed according to the following criteria:

<Criteria for Evaluating Thermal Shock Resistance>
○: No cracks of the polarizer were generated in the cutting part of the polarizing plate.
Δ: Many cracks of the polarizer 10 mm or less in size were generated in the cutting part of the polarizing plate.
x: Many cracks of the polarizer 100 mm or more in size were generated overall in the MD direction of the polarizer.

5. Evaluation of Curling Characteristic

Curling characteristics were evaluated according to the following criteria by laminating a protective film cut in the size of 130 mm×180 mm (width (transverse direction (TD))×length (MD direction)) with a polarizer using an adhesive composition during an operation of forming a polarizing plate, and measuring curling occurring in the TD direction during radiation with UV rays or drying when a water-based polyvinylalcohol-based adhesive was used. The measurement of curling was performed by the method illustrated in FIG. 4.

<Evaluation Criteria>

◯: Curling occurring in the TD direction was less than 0.5 cm.

Δ: Curling occurring in the TD direction was 0.5 cm to 2.0 cm x: Curling occurring in the TD direction was more than 2.0 cm 6. Evaluation of Weight Average Molecular Weight and Distribution of Molecular Weight The weight average molecular weight and the distribution of the molecular weight of an acryl polymer were measured using GPC under the following conditions. To draw a calibration curve, standard polystyrene of an Agilent system was used, and measurement results were converted.

<Conditions for Measuring Weight Average Molecular Weight>

Measuring Apparatus Agilent GPC (Agilent 1200 series, USA)

Column: two connected PL mixed B

Column Temperature: 40° C.

Eluent: Tetrahydrofuran

Flow Rate: 1.0 mL/min

Concentration: ~2 mg/mL (100 μL injection)

7. Evaluation of Adhesion Uniformity

Adhesion uniformity was evaluated by distinguishing flat exterior as ◯ from curved exterior as x.

The evaluation results are summarized and listed in Tables 2 and 3.

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Kind of Protective Film | Acryl | TAC | Acryl | Acryl | Acryl | Acryl | Acryl | Acryl | Acryl | Acryl | Acryl |
| Thickness of Adhesive Layer (μm) | 5 | 5 | 10 | 20 | 0.15 | 5 | 5 | 5 | 5 | 5 | 5 |
| Curing Type for Adhesive | UV Rays | UV Rays | UV Rays | UV Rays | UV Rays | UV Rays | UV Rays | UV Rays | UV Rays | UV Rays | UV Rays |
| Kind of Adhesive | hybrid | hybrid | hybrid | hybrid | hybrid | hybrid | hybrid | hybrid | hybrid | hybrid | cationic |
| Composition of Adhesive | A | A | A | A | A | B | C | D | E | F | G |
| Tg (° C.) | 52 | 52 | 52 | 52 | 52 | 54 | 61 | 69 | 80 | 97 | 112 |
| Thickness of Pressure-Sensitive Adhesive Layer (μm) | 50 | 50 | 50 | 50 | 50 | 50 | 50 | 50 | 50 | 50 | 50 |
| Thermal Resistance | ◯ | ◯ | ◯ | ◯ | ◯ | ◯ | ◯ | ◯ | ◯ | ◯ | ◯ |
| Humidity & Thermal Resistance | ◯ | ◯ | ◯ | ◯ | ◯ | ◯ | ◯ | ◯ | ◯ | ◯ | ◯ |
| Water Resistance | ◯ | ◯ | ◯ | ◯ | ◯ | ◯ | ◯ | ◯ | ◯ | ◯ | ◯ |
| Thermal Shock Resistance | ◯ | ◯ | ◯ | ◯ | ◯ | ◯ | ◯ | ◯ | ◯ | ◯ | ◯ |
| Adhesion Uniformity | ◯ | ◯ | ◯ | ◯ | ◯ | ◯ | ◯ | ◯ | ◯ | ◯ | ◯ |
| Curling Characteristic | ◯ | ◯ | ◯ | ◯ | ◯ | ◯ | ◯ | ◯ | ◯ | ◯ | ◯ |

TABLE 3

| | Comparative Example | | | | | | |
|---|---|---|---|---|---|---|---|
| | 1 | 2 | 3 | 4 | 5 | 6 | 7 |
| Kind of Protective Film | Acryl | Acryl | Acryl | TAC | Acryl | Acryl | Acryl |

TABLE 3-continued

| | Comparative Example | | | | | | |
|---|---|---|---|---|---|---|---|
| | 1 | 2 | 3 | 4 | 5 | 6 | 7 |
| Thickness of Adhesive Layer (μm) | 5 | 0.08 | 32 | 0.1 | 5 | 5 | 5 |
| Curing Type for Adhesive | UV Rays | UV Rays | UV Rays | Water-based drying and curing | UV Rays | UV Rays | UV Rays |
| Kind of Adhesive | hybrid | hybrid | hybrid | hybrid | hybrid | hybrid | radical |
| Composition of Adhesive | A | A | A | Water-based | H | I | J |
| Tg (° C.) | 52 | 52 | 52 | 90 | 25 | 40 | 24 |
| Thickness of Pressure-Sensitive Adhesive Layer (μm) | 8 | 50 | 50 | 50 | 8 | 8 | 8 |
| Thermal Resistance | x | x | ○ | ○ | x | x | x |
| Humidity & Thermal Resistance | Δ | Δ | ○ | ○ | Δ | Δ | Δ |
| Water Resistance | ○ | x | ○ | ○ | ○ | ○ | ○ |
| Thermal Shock Resistance | x | x | ○ | ○ | x | x | x |
| Adhesion Uniformity | ○ | ○ | x | x | ○ | ○ | ○ |
| Curling Characteristic | ○ | ○ | ○ | x | ○ | ○ | ○ |

What is claimed is:

1. A polarizing plate, comprising:
a polarizer;
an adhesive layer formed of an active energy beam-curable adhesive, having a thickness of 0.1 to 30 μm; and
a pressure-sensitive adhesive layer having a thickness of 10 to 80 μm, which are sequentially disposed,
wherein the pressure-sensitive adhesive layer has first and second surfaces, the first surface having a higher tensile modulus than the second surface,
wherein the first surface of the pressure-sensitive adhesive layer is directly attached to a surface of the adhesive layer, and has a surface swollen by single-molecular reactive material of the active energy beam-curable adhesive, before the active energy beam-curable adhesive is cured,
wherein the pressure-sensitive adhesive layer comprises an interpenetrating polymer network including a crosslinked structure including an acryl resin crosslinked by a multifunctional crosslinking agent, and a crosslinked structure including polymerized multifunctional acrylate,
wherein the surface of the adhesive layer which is opposite to the surface directly attached to the pressure-sensitive adhesive layer, is directly attached to a surface of the polarizer, and
wherein the first surface of the pressure-sensitive adhesive layer has a tensile modulus at 25° C. of 100 to 500 MPa and the second surface of the pressure-sensitive adhesive layer has a tensile modulus at 25° C. of 0.02 to 0.3 MPa.

2. The polarizing plate according to claim 1, wherein the adhesive layer includes an adhesive composition including an epoxy compound and/or an acryl-based monomer in a cured state.

3. The polarizing plate according to claim 2, wherein the adhesive composition has a glass transition temperature after curing of 50° C. or more.

4. The polarizing plate according to claim 2, wherein the epoxy compound includes an alicyclic epoxy compound and/or a glycidyl ether-type epoxy compound.

5. The polarizing plate according to claim 2, wherein the epoxy compound has a weight average molecular weight of 1,000 to 5,000.

6. The polarizing plate according to claim 2, wherein the acryl-based monomer is a hydrophilic acryl-based monomer or a hydrophobic acryl-based monomer.

7. The polarizing plate according to claim 6, wherein the hydrophilic acryl-based monomer has a hydroxyl group, a carboxyl group or an alkoxy group.

8. The polarizing plate according to claim 2, wherein the adhesive composition further includes 1 to 40 parts by weight of a reactive oligomer.

9. The polarizing plate according to claim 2, wherein the adhesive composition is a non-solvent type.

10. The polarizing plate according to claim 2, wherein the adhesive composition has a viscosity of 5 to 1,000 cps at 25° C.

11. The polarizing plate according to claim 1, wherein the acryl resin includes a (meth)acrylic acid ester-based monomer in a polymerization unit.

12. The polarizing plate according to claim 11, wherein the acryl resin further includes a monomer represented by Formula 16 in a polymerization unit:

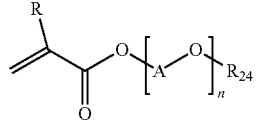

[Formula 16]

where R is hydrogen or an alkyl group, A is alkylene, $R_{24}$ is an alkyl group or an aryl group, and n is a number between 1 and 6.

13. The polarizing plate according to claim 1, further comprising:
a protective film attached to a surface of the polarizer opposite a surface to which the pressure-sensitive adhesive layer is attached.

14. A liquid crystal display device, comprising:
a liquid crystal panel; and
the polarizing plate according to claim 1 attached to one or both surfaces of the liquid crystal panel.

15. The device according to claim 14, wherein the liquid crystal panel is attached to the pressure-sensitive adhesive layer.

* * * * *